C. COPELAND.
INTERNAL COMBUSTION ENGINE.
APPLICATION FILED JULY 26, 1915.
1,192,991.
Patented Aug. 1, 1916.
2 SHEETS—SHEET 1.
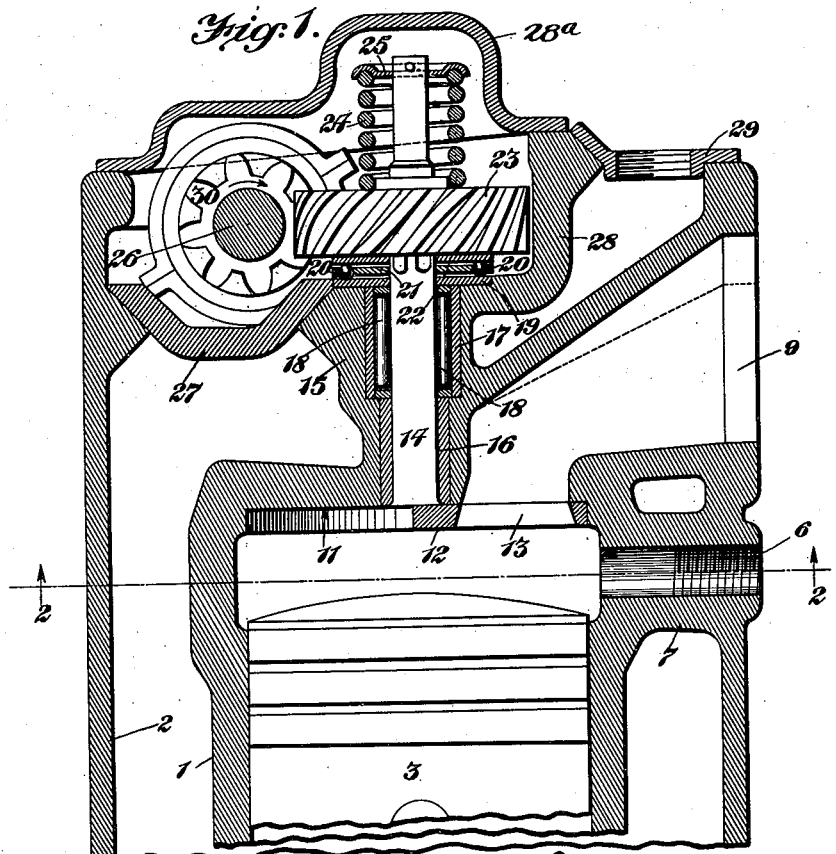
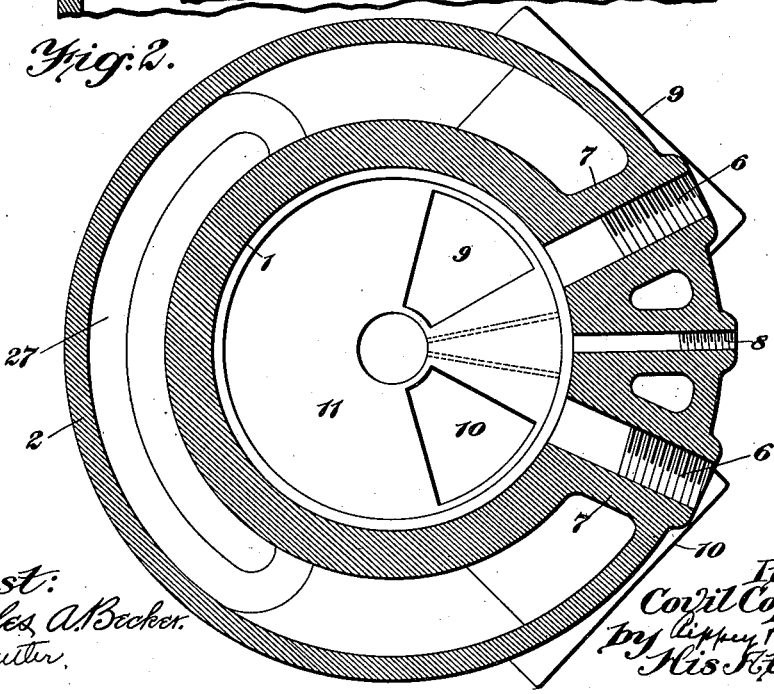
Attest:
Charles A. Becker.
N. H. Butler.
Inventor
Covil Copeland,
by Lippey & Kingman
His Attorneys

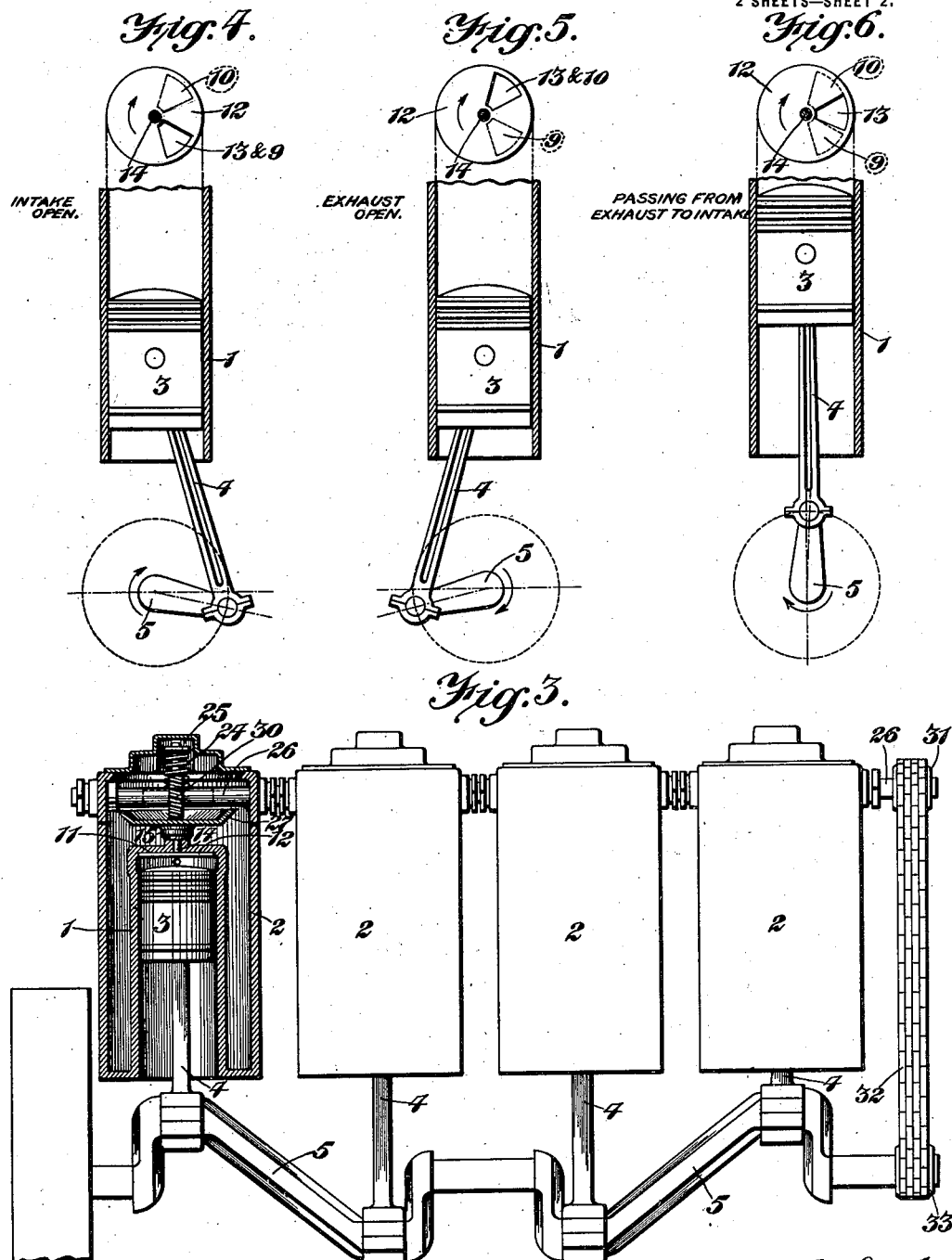

UNITED STATES PATENT OFFICE.

COVIL COPELAND, OF HIAWATHA, KANSAS.

INTERNAL-COMBUSTION ENGINE.

1,192,991.          Specification of Letters Patent.      Patented Aug. 1, 1916.

Application filed July 26, 1915. Serial No. 41,882.

*To all whom it may concern:*

Be it known that I, COVIL COPELAND, a citizen of the United States, residing at the city of Hiawatha, county of Brown, and State of Kansas, have invented a new and useful Internal-Combustion Engine, of which the following is a specification.

This invention relates to internal combustion engines.

The object of the invention is to provide an internal combustion engine of novel and improved construction and comprising a cylinder having inlet and exhaust passages, and a movable valve which, in the present instance, is a disk plate mounted within the cylinder against one wall thereof and which is operated by novel connections from the crank shaft effectively to open and close the inlet and exhaust passages in proper sequence to control the admission of the carbureted air into the cylinder and the exhaust of the products of explosion from the cylinder.

Another object is to provide an improved internal combustion engine having a disk valve mounted within the cylinder thereof and operating to control the inlet and exhaust passages, the connections for operating the disk valve including a spiral gear mounted on the stem of the valve and meshing with another spiral gear supported on an independent shaft and driven by suitable connections from the crank shaft to the engine, whereby the valve will operate at one-half of the speed of the crank shaft, thus enabling the piston by one movement to compress the carbureted air within the cylinder proportionate for the explosion, and on the next movement to eject the products of combustion from the cylinder proportionate for admission of another charge of carbureted air on the succeeding downward stroke of the piston.

Other objects will appear from the following description, reference being made to the accompanying drawings, in which—

Figure 1 is a vertical sectional view of a portion of an engine illustrating the operating mechanism of the valve. Fig. 2 is a horizontal sectional view on the line 2—2 of Fig. 1, with the valve removed showing the inlet and exhaust passages of the cylinder. Fig. 3 illustrates a series of four cylinders, one of which is shown in section and in which the valves for the several cylinders are driven by a single shaft operated by the crank shaft of the engine. Fig. 4 is a view illustrating the position of the valve and piston when the valve is in position to open the inlet passage. Fig. 5 is a similar view showing the same ports when the valve is in position to open the exhaust passage. Fig. 6 is a similar view illustrating the same ports when both the exhaust and the inlet passages are closed by the valve passing from the exhaust to the inlet.

The engine comprises a series of cylinders 1, each of which is intended to be inclosed within a water jacket formed by an inclosing wall 2. Reciprocating pistons 3 of the usual, or any preferred construction are operatively mounted within the cylinders 1 and are provided with piston rods 4 which are connected with the cranks of a crank shaft 5, so that the latter will be driven by the operation of the pistons.

Spark plugs 6 are carried in suitable mountings 7 supported by the walls of the cylinder and the water jacket, and a primer 8 is similarly supported for well understood purposes.

An inlet passage 9 opens through the upper end wall of the cylinder and a similar passage 10 for the exhaust is also provided through the end wall of the cylinder. The upper end wall of the cylinder is formed with a smoothly ground bearing surface 11, against which is rotatably supported a disk valve 12 which fits closely within the seat provided therefor at the end of the cylinder. The valve disk 12 is provided with a single opening 13 adapted to be brought successively into registration with the inlet and exhaust passages of the cylinder.

The valve 12 is supported and operated by a valve stem 14 which is journaled in suitable bearings provided therefor in a supporting portion 15, which is an integral union with the walls of the cylinder and water jacket.

The bearing includes a lower portion in the form of a bushing 16, the lower end of which is flush with the ground surface 11 at the end of the cylinder, and an upper portion in the form of anti-friction devices and including a sleeve 17 in which the roller bearing elements 18 are mounted and which operate between the valve stem and said sleeve. Above the roller bearing elements 18 a plate 19 is seated on the bearing support 15. The plate 19 constitutes a support or track for the anti-friction devices 20 retained in place by a retaining member 21 attached to the valve stem and supported out of contact with the plate 19. A plate 22 is attached to the valve stem above the anti-friction devices and serves to retain them permanently in position within the openings in the plate 21, so that said anti-friction devices cannot become displaced.

A spiral gear 23 is mounted on the valve stem 14 and is slidable with respect to the valve stem, but cannot revolve independently of said stem. The stem 14 projects some distance above the spiral gear 23 and is encircled by a strong coil spring 24 of the expansion type, the lower end of said spring bearing upon the gear 23 and the upper end bearing against an abutment 25 in connection with the upper end of the valve stem. The spiral gear 23 is driven so as to operate the valve 12 by suitable driving connections from the crank shaft, which I will now describe.

An over-head shaft 26 is journaled in suitable bearings in the cylinder castings above the upper ends of the cylinders, so that a single shaft thus mounted and driven from the crank shaft to the engine is utilized to operate all of the valves in proper relation to each other, in order to open and close the inlet and exhaust passages of the several cylinders in proper sequence. In the embodiment illustrated there are four cylinders, but it is obvious that the number may be varied and that the same shaft may be utilized to operate the valves of different numbers of cylinders. The shaft 26 extends through spaces provided therefor above the water jacket spaces.

A partition 27 in each unit of the engine separates the water jacket from the space through which the shaft 26 extends, so that it is impossible for the water circulating through the water jacket to come into contact with the shaft 26 or with any other parts of the valve operating mechanism.

The space in which the spiral gear 23 and the other coöperating parts are mounted is separated from the water jacket space by a partition 28 which is an integral part of the casting of which the cylinder and the water jacket wall is composed. The water manifold 29 enters the space between the partition 28 and the wall 2 of the water jacket.

The space within the walls 27—28 and the portion of the wall 2 between the ends of the wall 28 forms a chamber which is closed by a removable cap 28ª. This chamber incloses the operating mechanism for the valve and, in addition to preventing foreign substances coming in contact with the operating mechanism, is adapted also to contain oil or other lubricant for the operating mechanism, causing it to run smoothly without binding.

The shaft 26 supports and drives a series of spiral gears 30, one of which is in mesh with each of the spiral gears 23, and said gears 23 and 30 are formed in ratio of two to one, so that the valve will be driven one revolution at each two revolutions of the crank shaft through the operation of the intermediate driving connections.

The shaft 26 is provided on one end with a sprocket wheel 31 over which operates a silent chain 32 composed of parallel series of links, said chain being driven by a sprocket wheel 33 upon the crank shaft. The wheels 31 and 33 are of the same size so that the shaft 26 is driven at the same speed as the crank shaft and from which it follows that, because of the proportions of the wheels 23 and 30 with respect to each other, the valve 12 will be turned one revolution at each two revolutions of the crank shaft.

The valve mechanism constructed and arranged as described is accurate and positive in its operation and the valve is pressed closely to its seat by the compression of the carbureted air on the upward movement of the piston, so that it is impossible for any of the carbureted air to escape through or be forced into either the inlet or exhaust passage when the carbureted air is under compression.

It will be understood that the invention may be modified in various particulars within equivalent limits without variation or departure from the principles disclosed. Therefore, I do not restrict myself to identical features of construction of arrangement, but

What I claim and desire to secure by Letters Patent is:—

1. An internal combustion engine comprising a cylinder having a tubular extension formed integral with the head thereof, inlet and exhaust passages entering the cylinder, a piston operatively mounted in said cylinder, and a crank shaft driven by the piston, in combination with a disk valve located within the cylinder and adapted to seat against the inner wall of the head thereof, a stem integrally united with said valve and extending through said tubular extension, roller bearings mounted in said tubular extension contacting with said stem and adapted to maintain the stem in axial alinement, a spiral gear connected to said stem adapted to move longitudinally thereof, an expansion spring adapted to actuate said stem outwardly and thereby hold said disk valve to its seat, and driving mechanism entrained with said spiral gear and actuated by the crank shaft of the engine whereby said disk valve is operated, substantially as specified.

2. An internal combustion engine comprising a cylinder having inlet and exhaust passages at one end thereof, a piston operative within the cylinder and a crank shaft driven by the piston, in combination with a disk valve within the cylinder seated against the end thereof for controlling the inlet and exhaust passages, an extension on the head of the cylinder, a stem rigid with the valve and extending through said extension, a bushing in said extension constituting a journal for said stem, roller bearings mounted in said extension outwardly from the bushing and adapted to maintain the stem in proper position, a spiral gear slidable longitudinally on the stem, a spring encircling and actuating the stem outwardly and the spiral gear inwardly and arranged to retain the valve against the end of the cylinder, a shaft journaled in bearings supported by the engine casing, a spiral gear on said shaft meshing with the gear on the valve stem, and a chamber inclosing said gears and adapted to contain a lubricant therefor.

3. An internal combustion engine comprising a cylinder provided with inlet and exhaust passages through one end thereof, a piston arranged to operate within the cylinder, a crank shaft driven by the piston, a disk valve within the cylinder seated against one end thereof for controlling the inlet and exhaust passages, an extension from the end of the cylinder, a bushing in said extension, a stem rigid with the valve journaled in said bushing, roller bearings for said stem mounted in said extension outwardly from said bushing, a spiral gear mounted on said stem, anti-friction elements between said gear and the end of the extension, a spring mounted above the gear and actuating the stem outwardly to hold the valve against the end of the cylinder and actuating the gear inwardly, a shaft journaled in bearings supported by the engine casing, a spiral gear on said shaft meshing with the gear on the stem, a crank shaft driven by the piston, connections for driving the other shaft from the crank shaft, and a lubricant chamber inclosing said gears and said spring.

4. An internal combustion engine comprising a cylinder, a piston operatively mounted in said cylinder, inlet and exhaust passages for said cylinder, in combination with a disk valve mounted within the cylinder and adapted to seat against the head of the cylinder, a rigid bushing mounted in the head of the cylinder, a stem attached to said valve and mounted in said bushing, roller bearings for maintaining said stem in axial alinement mounted above said bushing, resilient means for actuating said stem outwardly and thereby holding said valve on its seat, means for driving said stem, and a case for inclosing said driving mechanism, substantially as specified.

In witness whereof, I have signed this application in the presence of two subscribing witnesses.

COVIL COPELAND.

Witnesses:
MARION COPELAND,
WILLIAM H. BABCOCK.